(12) United States Patent
Guo et al.

(10) Patent No.: US 9,404,463 B2
(45) Date of Patent: Aug. 2, 2016

(54) METHOD FOR PERFORMING EVAPORATIVE EMISSION SYSTEM DIAGNOSTICS ON ENGINES CONFIGURED FOR STOP-START OPERATION

(71) Applicant: DELPHI TECHNOLOGIES, INC., Troy, MI (US)

(72) Inventors: Yichao Guo, Auburn Hills, MI (US); Kenneth M. Simpson, Swartz Creek, MI (US); James W. Jeffers, Linden, MI (US)

(73) Assignee: Delphi Technologies, Inc., Troy, MI (US)

( * ) Notice: Subject to any disclaimer, the term of this patent is extended or adjusted under 35 U.S.C. 154(b) by 800 days.

(21) Appl. No.: 13/770,629

(22) Filed: Feb. 19, 2013

(65) Prior Publication Data
US 2014/0236458 A1 Aug. 21, 2014

(51) Int. Cl.
*F02N 11/08* (2006.01)
*F02D 41/00* (2006.01)
*F02M 25/08* (2006.01)

(52) U.S. Cl.
CPC ........ *F02N 11/0829* (2013.01); *F02D 41/0032* (2013.01); *F02M 25/0809* (2013.01); *Y02T 10/48* (2013.01)

(58) Field of Classification Search
CPC ............ F02N 11/0803; F02N 11/0814; F02N 11/0818; F02N 11/0829; F02D 41/003; F02D 41/0032; F02D 41/0035; F02D 41/0037
See application file for complete search history.

(56) References Cited

U.S. PATENT DOCUMENTS

| | | | | |
|---|---|---|---|---|
| 5,400,759 A | * | 3/1995 | Ishida | F02M 25/0809 123/198 D |
| 6,449,539 B1 | * | 9/2002 | Ohno | G05B 23/0229 340/439 |
| 6,557,534 B2 | | 5/2003 | Robichaux et al. | |
| 8,155,917 B2 | | 4/2012 | Maegawa | |
| 2005/0241377 A1 | * | 11/2005 | Takahashi | G01M 3/3236 73/114.39 |
| 2009/0043476 A1 | * | 2/2009 | Saito | B60W 10/26 701/102 |
| 2012/0152210 A1 | | 6/2012 | Reddy et al. | |
| 2013/0116913 A1 | * | 5/2013 | Fukui | B60W 20/00 701/112 |

* cited by examiner

*Primary Examiner* — Stephen K Cronin
*Assistant Examiner* — Anthony L Bacon
(74) *Attorney, Agent, or Firm* — Joshua M. Haines

(57) ABSTRACT

A method of operating an engine in a vehicle equipped with an evaporative emissions system is described. The engine is configured to perform automatically an engine stop and an engine restart when the vehicle stops moving to increase fuel economy of the vehicle. The method includes the steps of determining if an engine stop is allowed while a diagnostic test of the of the evaporative emissions system is being performed if an engine stop is requested, and preventing the engine stop if the engine stop is not allowed.

15 Claims, 5 Drawing Sheets

METHOD FOR PERFORMING EVAPORATIVE EMISSION SYSTEM DIAGNOSTICS ON ENGINES CONFIGURED FOR STOP-START OPERATION

TECHNICAL FIELD OF INVENTION

This disclosure generally relates to a method of operating an engine equipped with an evaporative emissions system, wherein the engine is configured to automatically stop when the vehicle stops moving to increase fuel economy of the vehicle, and more particularly relates to preventing an engine stop if the engine stop interferes with completing a diagnostic test of the evaporative emission system.

BACKGROUND OF INVENTION

Government regulations require vehicles be configured to perform self-diagnostic testing of the evaporative emission (EVAP) system on the vehicle. Typically, vacuum pressure generated by a running engine is used to create certain conditions in the EVAP system so diagnostic testing can be performed. However, some engines are configured to automatically stop and restart to increase fuel economy. For example, when the vehicle is stopped at a traffic light, the engine may automatically stop running. Then, when the driver releases the brake pedal or presses the accelerator pedal because the traffic light turned green, the engine restarts automatically. This automatic stopping and restarting (i.e. stop-start operation) of the engine may interrupt the diagnostic testing of the EVAP system because the source of vacuum pressure is lost when the engine stops. As such, frequent stopping of the engine may make it difficult to perform the required diagnostic testing of the EVAP system if the system relies on a running engine to provide the vacuum pressure necessary for diagnostic testing.

SUMMARY OF THE INVENTION

In accordance with one embodiment, a method of operating an engine in a vehicle equipped with an evaporative emissions system is provided. The engine is configured to perform automatically an engine stop and an engine restart when the vehicle stops moving to increase fuel economy of the vehicle. The method includes the steps of determining if an engine stop is allowed while a diagnostic test of the of the evaporative emissions system is being performed if an engine stop is requested, and preventing the engine stop if the engine stop is not allowed.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Described herein is a method that overcomes the problems described above by preventing the stopping of the engine to avoid the subsequent loss of vacuum pressure that is needed for certain aspects of evaporative emissions (EVAP) system diagnostic testing. In general, software that incorporates the teaching of the method described herein controls the operation of the engine and execution of the EVAP diagnostic tests. The software typically includes calibration information that can be calibrated to prioritize the execution of the diagnostic tests, or prioritize the stopping of the engine to maximize fuel economy. Furthermore, as will be described in more detail below, software corresponding to the method also typically includes the decision of whether to stop an engine or prevent the engine from stopping so the diagnostic test can be completed. This decision may be based on other calibration values (i.e. thresholds) and a comparison of those thresholds to the number of times that, for example, a diagnostic test has been aborted because the engine was allowed to stop. By way of example and not limitation, if a diagnostic test is aborted more than five times because the engine was allowed to stop, the software (i.e. the method) may prevent the engine from stopping until the diagnostic tests are complete.

Figure 1:
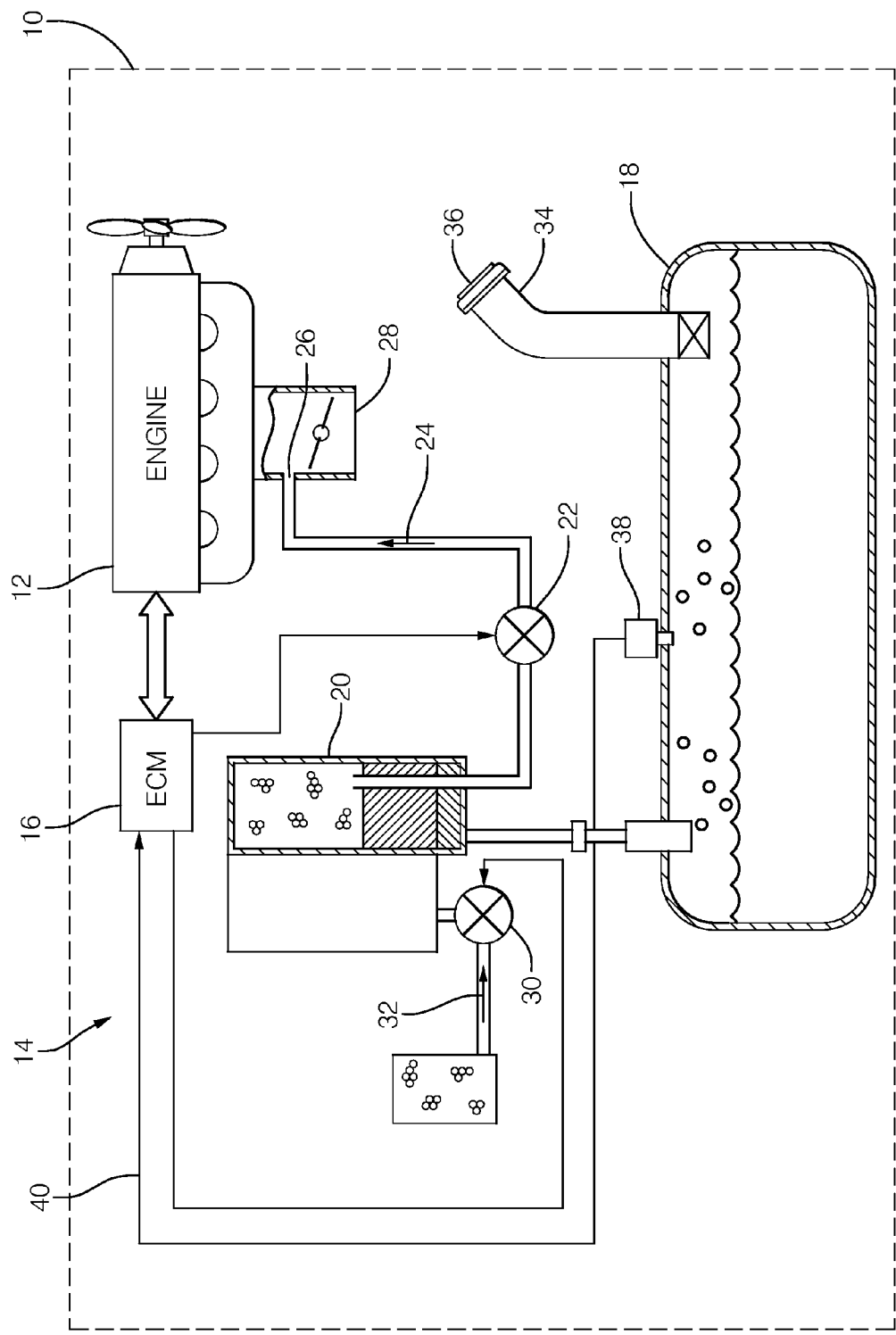
FIG. 1 is a diagram of a evaporative emission system and an engine in a vehicle in accordance with one embodiment.

FIG. 1 illustrates a non-limiting example of a vehicle, illustrated here as a box, and hereafter often referred to as the vehicle 10. The vehicle 10 may be, for example, an automobile or a truck, as will be recognized by those skilled in the transportation arts. However, the teachings presented herein may also be used for stationary power generating or pumping facilities. In general, the vehicle 10 is equipped with an engine 12, and an evaporative emissions (EVAP) system, hereafter often referred to as the EVAP system 14. The vehicle 10 may include an engine control module (ECM) or engine controller, hereafter often referred to as the controller 16. The controller 16 may include a processor (not shown) such as a microprocessor or other control circuitry as should be evident to those in the art. The controller 16 may include memory, including non-volatile memory, such as electrically erasable programmable read-only memory (EEPROM) for storing one or more routines, thresholds and captured data. The one or more routines may be executed by the processor to perform steps for determining signals sent and received by the controller 16 for operating the engine 12 and the EVAP system 14 as described herein.

Many of the details illustrated in FIG. 1 are commonly found in typical EVAP systems, and are only shown for the purpose of explanation and not a limitation. Furthermore, it is recognized that the EVAP system 14 may include additional features not shown in FIG. 1. The EVAP system 14 may include a fuel tank 18 for storing fuel to run the engine 12. While not subscribing to any particular theory, fuels such as gasoline evaporate, and evaporated gasoline has been deemed an undesirable pollutant. Accordingly, a canister 20 is provided to capture and store fuel vapors until a time when the canister 20 can be purged by applying vacuum typically provide by the engine 12 to draw fresh air into the canister 20 and remove fuel vapors out of the canister 20. The EVAP system 14 includes a purge valve 22 configured to be operated by the controller 16 to regulate purge flow 24 into the engine 12. It will be recognized by those skilled in the art that the purge flow 24 is also influenced by the amount of vacuum generated by the engine 12 at a purge port 26, illustrated here as being downstream of a throttle plate of a throttle body 28.

The EVAP system 14 may also include a vent valve 30 operated by the controller 16 to regulate the amount of vent air 32 or filtered fresh air entering the canister 20. The system also includes a fuel fill inlet 34 so the fuel tank 18 can be refilled, and a fuel cap 36 that, when properly installed, seals the fuel tank so fuel vapors cannot escape to the environment via the fuel fill inlet 34. In the description that follows, it is assumed that the fuel cap 36 has been properly installed. The EVAP system 14 may also include a vacuum sensor 38 configured to determine a vacuum value 40 in the fuel tank 18, and communicate the vacuum value 40 to the controller 16.

By way of example and not limitation, the purge valve 22 and the vent valve 30 may both be operated to an open state so a vacuum pressure from the engine 12 can be used to purge fuel or fuel vapors from the canister. Alternatively, the vent valve 30 may be operated to a closed state while the purge valve 22 is operated to an open state and the engine 12 is generating a vacuum pressure so that a fuel tank pressure can be established in the canister 20 and in the fuel tank 18. Then, once a predetermined fuel tank pressure is established in the fuel tank, both the vent valve 30 and the purge valve 22 may be operated to a closed state and the fuel tank pressure indicated by the vacuum value 40 should persist for at least a brief period. As will become apparent in the description that follows, the rate at which the vacuum value 40 changes, or the amount that the vacuum value 40 changes over a time interval after the fuel tank pressure is established and both valves are closed is indicative of a leak size of a leak somewhere in the EVAP system 14.

FIG. 2 (FIGS. 2A-2D) illustrates a non-limiting example of a method 200 of operating an engine 12 in a vehicle 10 equipped with an evaporative emissions (EVAP) system 14. As noted previously, the engine 12 is configured to perform automatically an engine stop and an engine restart in order to increase the fuel economy of the vehicle 10, and doing so may interfere with on-board diagnostic testing of the EVAP system 14. In general, the various tests described below are designed to detect leaks of various features of the EVAP system 14. The various tests in this non-limiting example are sometimes referred to as: WARM LEAK TEST, PURGE-VALVE LEAK TEST, COLD LEAK TEST, and RESTRICTED PATH TEST, but may be known by other names. Information that motivates vehicle manufacturers to perform these tests is provided in regulations issued by the California Air Resources Board (CARB) for Evaporative Emission Control Systems.

It should be appreciated that the entire suite of tests listed above needs to be performed in order to determine which aspect or feature of the EVAP system 14 has most likely developed a leak or is inoperative. It should also be appreciated that prior EVAP system diagnostic tests would abort the sequence of tests if the engine 12 was stopped or turned off during the sequence of tests. As such, the method of operating the engine 12 and conducting the diagnostic tests described herein is an improvement over the prior art. In particular, momentary engine off events where, for example, the time duration between an engine stop and a subsequent engine restart is less than two minutes can be tolerated by the method and system described herein.

Step 202, WARM LEAK TEST ENABLED?, may include determining if the operating conditions of the vehicle 10 or the engine 12 are suitable for performing a warm leak test. By way of example and not limitation, the warm leak test may be enabled (YES) if sensor input parameters indicate that the vehicle environmental conditions provide for a state of higher fuel volatility and/or insufficient engine soaking (i.e. engine at rest), and the warm leak test may not be enabled (NO) if these condition are not met.

Step 204, PURGE VALVE LEAK TEST ENABLED?, may include determining if the operating conditions of the vehicle 10 or the engine 12 are suitable for performing a purge valve leak test. By way of example and not limitation, the purge valve leak test may be enabled (YES) if sensor input parameters indicate that the vehicle environmental conditions provide for a state of lower fuel volatility and/or sufficient engine soaking (i.e.—engine at rest), and the purge valve leak test may not be enabled (NO) if these condition are not met.

The purge valve leak test may be performed to detect a leak across the purge valve 22 by detecting an increase in vacuum value 40 (i.e. a decrease in absolute pressure) indicated by the vacuum sensor 38 while the engine is running and both the purge valve 22 and the vent valve 30 are operated to the closed state by the ECM. This test is performed because a leak across the purge valve 22 can allow hydrocarbons from the tank to leak to the atmosphere when the engine is off. Because the EVAP system 14 is supposed to be sealed when the purge valve 22 and the vent valve 30 are operated to the closed state, an increase in the vacuum value 40 (i.e. a decrease in the absolute pressure) constitutes a leakage in the system. The test is preferably calibrated to detect a one-half millimeter (0.5 mm) leak path through the purge valve 22. By performing the other tests described herein, a leak path through the purge valve 22 can be isolated as the most likely fault with the EVAP system 14. It is preferable that the engine 12 run throughout this entire purge-valve leak test, which typically has a test duration of 30 seconds. However, if an engine stop is forthcoming, the purge-valve leak test may be interrupted prior to the engine stop, and then the purge-valve leak test may be resumed following an engine restart if the engine restart occurs within, for example, two minutes following the engine stop.

Step 206, COLD LEAK TEST ENABLED?, may include determining if the operating conditions of the vehicle 10 or the engine 12 are suitable for performing a cold leak test. By way of example and not limitation, the cold leak test may be enabled (YES) if sensor input parameters indicate that the vehicle environmental conditions provide for a state of lower fuel volatility and/or sufficient engine soaking (i.e.—engine at rest) and the purge valve leak test has completed, and the cold leak test may not be enabled (NO) if these conditions are not met. The cold leak test may be partitioned into several portions such as one or more of: a large leak test, a small leak test, and a very small leak test. By way of example, the large leak test may be performed to determine if EVAP system 14 has a leak corresponding to a hole greater than one millimeter hole (>1.0 mm leak). Similarly, the small leak test may be performed to detect leaks corresponding to a hole size between one millimeter and one-half millimeter (1.0 mm to 0.5 mm leak), and the very-small leak test may be performed to detect a hole smaller than one-half millimeter (<0.5 mm leak).

Step 208, RESTRICTED PATH TEST ENABLED?, may include determining if the operating conditions of the vehicle 10 or the engine 12 are suitable for performing a restricted path leak test. By way of example and not limitation, the restricted path leak test may be enabled (YES) if sensor input parameters indicate that the vehicle environmental conditions provide for a state of lower fuel volatility and/or sufficient engine soaking (engine at rest) and the cold leak test has completed, and the restricted path leak test may not be enabled (NO) if these conditions are not met.

Figure 2A:
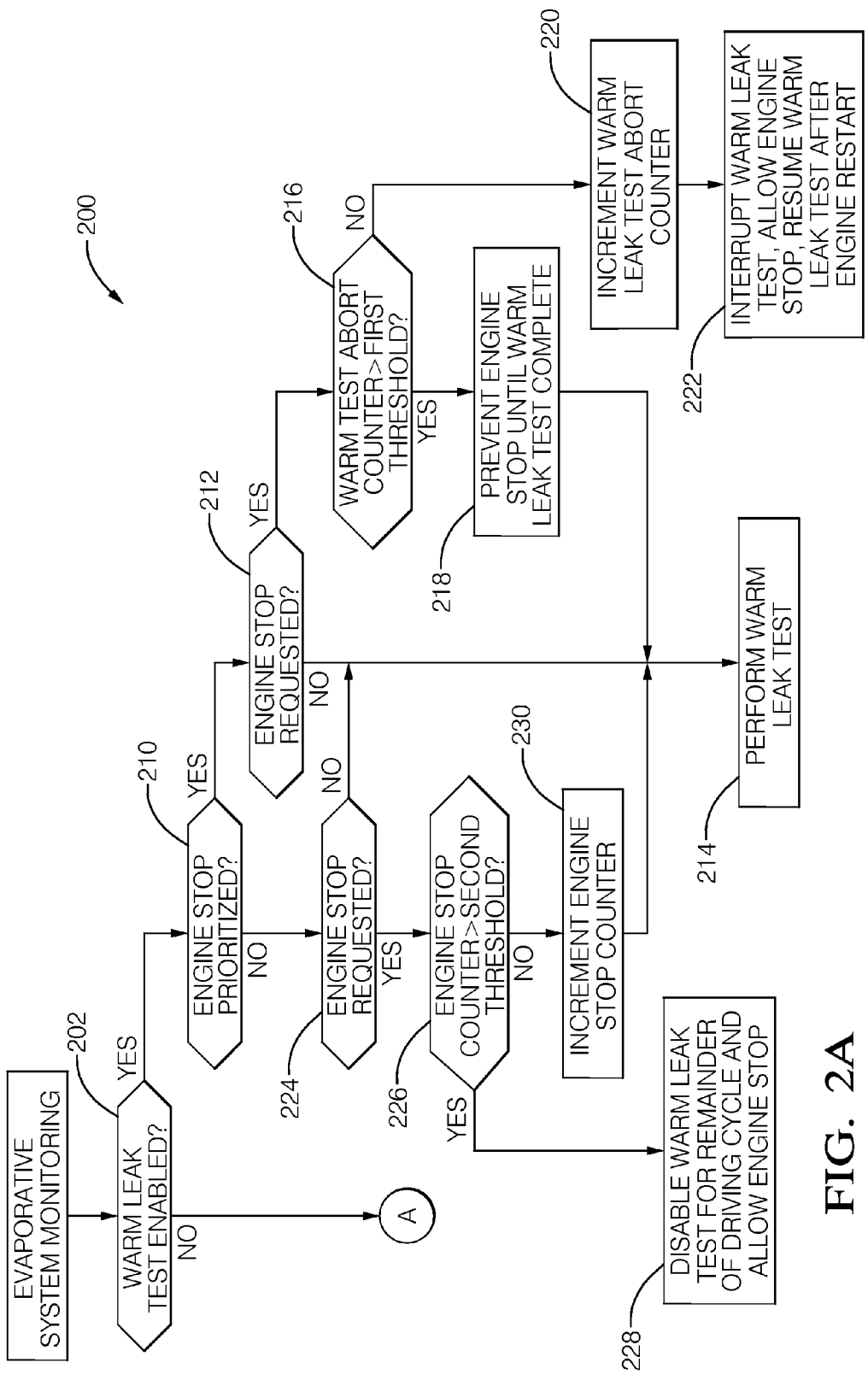
FIGS. 2A, 2B, 2C, and 2D combined form a flowchart of a method for operating the system of FIG. 1 in accordance with one embodiment.

Referring now to FIG. 2A, if the response of step 202, WARM LEAK TEST ENABLED?, is YES, then the method 200 proceeds to step 210, ENGINE STOP PRIORITIZED?. Otherwise, the method 200 proceeds to step 204. To complete step 210, the controller 16 may examine previously stored calibration variables to determine if the calibration indicates that an engine stop (maximizes fuel economy) is prioritized or preferred over preventing an engine stop (improves the chance that the warm leak test will be completed, i.e. not interrupted by an engine stop). If YES (calibration indicates that allowing an engine stop is preferred), the method 200 proceeds to step 212, ENGINE STOP REQUESTED?.

If an engine stop has not been requested (NO path from step 212) then the warm leak test is performed by step 214, PERFORM WARM LEAK TEST. However, if an engine stop has been requested, or an engine stop is requested after the warm leak test has been started, the method 200 follows the YES path from step 212 to step 216.

Step 216, WARM TEST ABORT COUNTER>FIRST THRESHOLD determines if prior attempts to complete the warm leak test have been aborted because an engine stop was allowed. If too many prior attempts have aborted, i.e. more attempts than the first threshold have been made, the YES logic path is taken to step 218, PREVENT ENGINE STOP UNTIL WARM LEAK TEST COMPLETE. This allows the warm leak test to be completed before allowing the engine 12 to stop. By way of example and not limitation, a suitable value for the first threshold is five, and so in this non-limiting example five engine stops will be allowed before an engine stop is prevented. This allows for the fuel economy increases provided for by operating the engine in a stop-start fashion to be realized until it is deemed that completion of the warm leak test is critical to assure compliance with government regulations, for example. Accordingly, the method 200 provides for incrementing a diagnostic abort counter each time the diagnostic test is aborted due to engine stop during a drive cycle if a calibration option designates that an engine stop is prioritized, wherein the engine stop is not allowed to interrupt the diagnostic test for the rest of the driving cycle if the diagnostic abort counter is greater than a threshold.

Accordingly, a method 200 of operating an engine 12 in a vehicle 10 equipped with an evaporative emissions system (the EVAP system 14) is provided, where the engine 12 is configured to perform automatically an engine stop and an engine restart when, for example, the vehicle 10 stops moving momentarily to increase fuel economy of the vehicle. This method includes the steps of determining if an engine stop is allowed while a diagnostic test of the of the evaporative emissions system is being performed if an engine stop is requested; and preventing the engine stop if the engine stop is not allowed because, for example, it has been determined that keeping the engine running so the diagnostic test can be completed is critical. As such, in this example the engine stop is not allowed if a diagnostic abort counter is greater than a threshold.

If the NO path from step 216 is taken, the method 200 proceeds to step 220, INCREMENT WARM LEAK TEST ABORT COUNTER, where, for example, the controller 16 increments a counter register in memory to keep track of the number of times in the present driving cycle the warm leak test has been aborted because an engine stop was allowed. Accordingly, the method 200 provides for a diagnostic abort counter that is incremented each time a diagnostic test is aborted during a drive cycle.

Following the incrementing of the warm leak test abort counter in step 220, the method 200 proceeds to step 222, INTERRUPT WARM LEAK TEST, ALLOW ENGINE STOP, RESUME WARM LEAK TEST AFTER ENGINE RESTART, where the warm leak test may be interrupted or paused, and then resumed when the engine 12 restarts. Accordingly, the method 200 provides for interrupting the diagnostic test an engine stop if the diagnostic abort counter is not greater than a threshold and an engine stop is requested; and resuming the diagnostic test after an engine restart. Step 222 may also include a timing operation that prevents the resuming of the warm leak test if the test is interrupted for an excessive amount of time, more than an hour for example. Accordingly, the method 200 provides for interrupting the warm leak test prior to the engine stop, then allowing an engine stop, and then resuming the warm leak test following an engine restart, during the warm leak test.

Referring back to step 210, if an engine stop is not prioritized (NO), the method 200 proceeds to step 224, ENGINE STOP REQUESTED?, which is similar to step 212, but shown as a separate step because of the distinct logic paths that follow. If an engine stop has not been requested (NO path from step 224) then the warm leak test is performed by step 214. However, if an engine stop has been requested, or an engine stop is requested after the warm leak test has been started, the method 200 follows the YES path from step 224 to step 226.

Step 226, ENGINE STOP COUNTER>SECOND THRESHOLD determines if prior attempts to complete the warm leak test have been aborted because an engine stop was allowed. If too many prior attempts have aborted, i.e. more engine stops than the second threshold have occurred, the YES logic path is taken to step 228, DISABLE WARM LEAK TEST FOR REMAINDER OF DRIVING CYCLE AND ALLOW ENGING STOP. This avoids further attempts to complete the warm leak test to be completed before allowing the engine 12 to stop. By way of example and not limitation, a suitable value for the second threshold is five, and so in this non-limiting example five aborted attempts to complete a warm leak test caused by engine stops will be allowed before further attempts to complete a warm leak test are prohibited. Accordingly, the method 200 provides for disabling the diagnostic test for the remainder of the driving cycle if the diagnostic abort counter is greater than a threshold. Furthermore, the method 200 provides for incrementing an engine stop abort counter each time an engine stop is prevented during the diagnostic test if a calibration option designates that an engine stop is not prioritized, and disabling the diagnostic tests for the rest of the driving cycle if the engine stop abort counter is greater than a threshold.

If the result of step 226 is NO, then the logic proceeds to step 230, INCREMENT ENGINE STOP COUNTER, where, for example, the controller 16 increments a counter register in memory to keep track of the number of times in the present driving cycle an engine stop was allowed while the warm leak test was in progress.

Figure 2B:
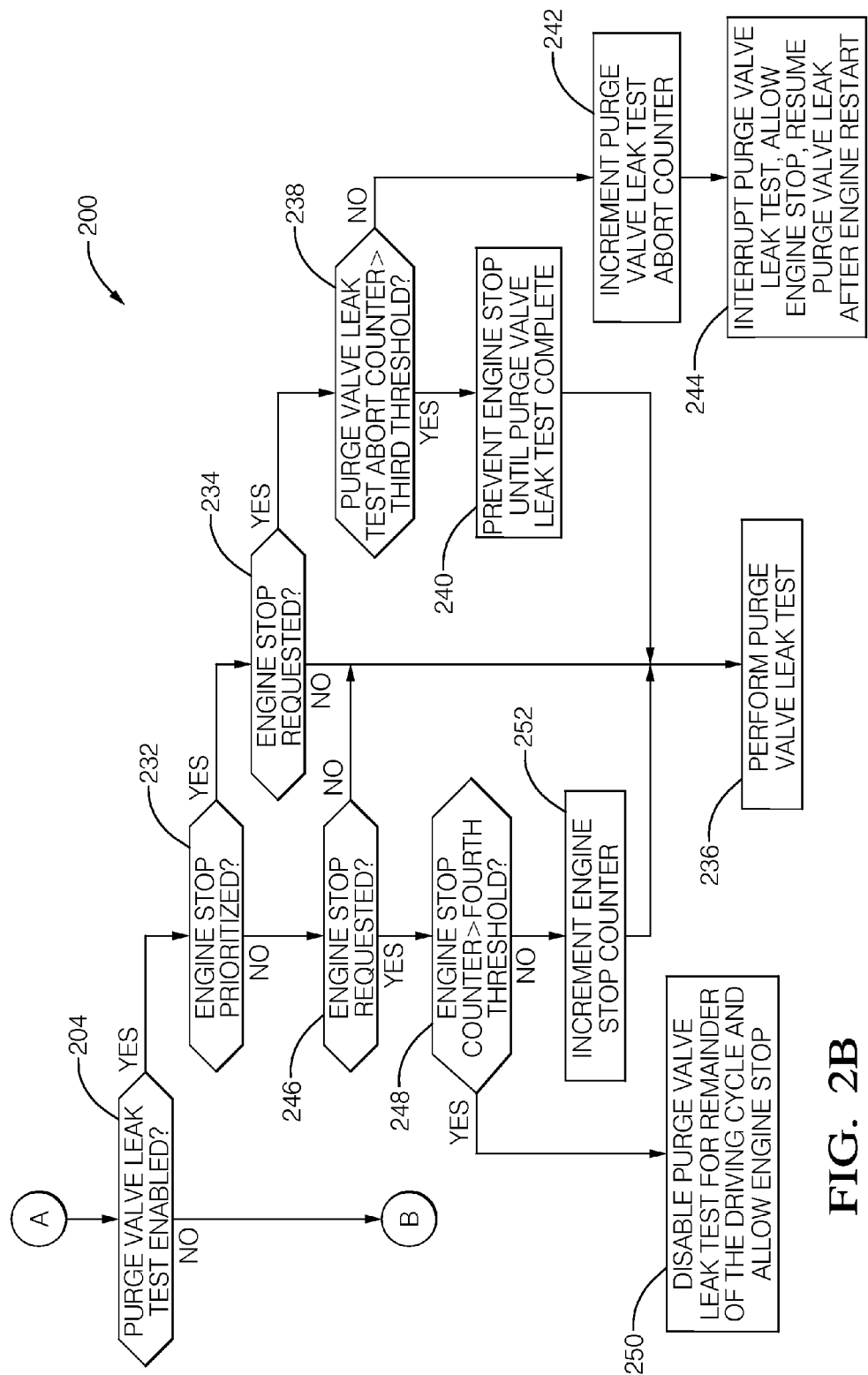

Referring now to FIG. 2B, if the response of step 204, PURGE VALVE LEAK TEST ENABLED?, is YES, then the method 200 proceeds to step 232, ENGINE STOP PRIORITIZED?. Otherwise, the method 200 proceeds to step 206. To complete step 232, the controller 16 may examine previously stored calibration variables to determine if the calibration indicates that an engine stop (maximizes fuel economy) is prioritized or preferred over preventing an engine stop (improves the chance that the warm leak test will be completed, i.e. not interrupted by an engine stop). If YES (calibration indicates that allowing an engine stop is preferred), the method 200 proceeds to step 234, ENGINE STOP REQUESTED?.

If an engine stop has not been requested (NO path from step 234) then the purge valve leak test is performed by step 236, PERFORM PURGE VALVE LEAK TEST. However, if an engine stop has been requested, or an engine stop is requested after the purge valve leak test has been started, the method 200 follows the YES path from step 234 to step 238.

Step 238, PURGE VALVE LEAK TEST ABORT COUNTER>THIRD THRESHOLD determines if prior attempts to complete the purge valve leak test have been aborted because an engine stop was allowed. If too many prior attempts have aborted, i.e. more attempts than the third threshold have been made, the YES logic path is taken to step 240, PREVENT ENGINE STOP UNTIL PURGE VALVE LEAK TEST COMPLETE. This allows the purge-valve leak test to be completed before allowing the engine 12 to stop. By way of example and not limitation, a suitable value for the third threshold is five, and so in this non-limiting example five engine stops will be allowed before an engine stop is prevented. This allows for the fuel economy increases provided for by operating the engine in a stop-start fashion to be realized until it is deemed that completion of the warm leak test is critical to assure compliance with government regulations, for example.

If the NO path from step 238 is taken, the method 200 proceeds to step 242, INCREMENT PURGE VALVE LEAK TEST ABORT COUNTER, where, for example, the controller 16 increments a counter register in memory to keep track of the number of times in the present driving cycle the purge valve leak test has been aborted because an engine stop was allowed.

Following the incrementing of the purge valve leak test abort counter in step 242, the method 200 proceeds to step 244, INTERRUPT PURGE VALVE LEAK TEST, ALLOW ENGINE STOP, RESUME PURGE VALVE LEAK TEST AFTER ENGINE RESTART, where the purge valve leak test may be interrupted or paused, and then resumed when the engine 12 restarts.

Referring back to step 232, if an engine stop is not prioritized (NO), the method 200 proceeds to step 246, ENGINE STOP REQUESTED?, which is similar to step 234, but shown as a separate step because of the distinct logic paths that follow. If an engine stop has not been requested (NO path from step 246) then the purge valve leak test is performed by step 214, PERFORM PURGE VALVE LEAK TEST. However, if an engine stop has been requested, or an engine stop is requested after the purge valve leak test has been started, the method 200 follows the YES path from step 246 to step 248.

Step 248, ENGINE STOP COUNTER>FOURTH THRESHOLD determines if prior attempts to complete the purge valve leak test have been aborted because an engine stop was allowed. If too many prior attempts have aborted, i.e. more engine stops than the second threshold have occurred, the YES logic path is taken to step 250, DISABLE PURGE VALVE LEAK TEST FOR REMAINDER OF DRIVING CYCLE AND ALLOW ENGING STOP. This avoids further attempts to complete the purge valve leak test before allowing the engine 12 to stop. By way of example and not limitation, a suitable value for the fourth threshold is five, and so in this non-limiting example five aborted attempts to complete a purge valve leak test caused by engine stops will be allowed before further attempts to complete the purge valve leak test are prohibited.

If the result of step 248 is NO, then the logic proceeds to step 252, INCREMENT ENGINE STOP COUNTER, where, for example, the controller 16 increments a counter register in memory to keep track of the number of times in the present driving cycle an engine stop was allowed while the purge-valve leak test was in progress.

Figure 2C:
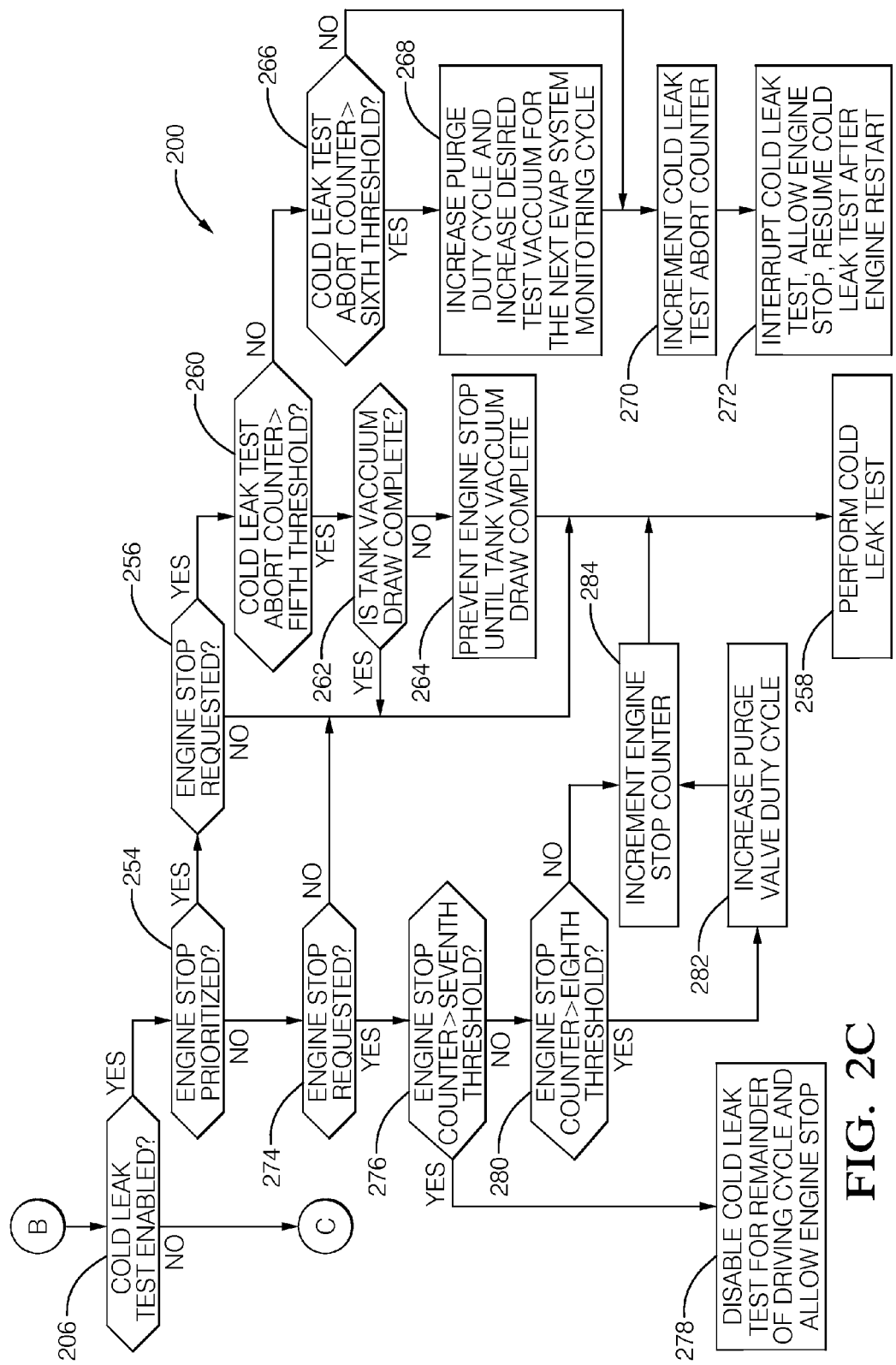

Referring now to FIG. 2C, if the response of step 206, COLD LEAK TEST ENABLED?, is YES, then the method 200 proceeds to step 254, ENGINE STOP PRIORITIZED?. Otherwise, the method 200 proceeds to step 208. To complete step 254, the controller 16 may examine previously stored calibration variables to determine if the calibration indicates that an engine stop (maximizes fuel economy) is prioritized or preferred over preventing an engine stop (improves the chance that the cold leak test will be completed, i.e. not interrupted by an engine stop). If YES (calibration indicates that allowing an engine stop is preferred), the method 200 proceeds to step 256, ENGINE STOP REQUESTED?.

If an engine stop has not been requested (NO path from step 256) then the cold leak test is performed by step 258, PERFORM COLD LEAK TEST. However, if an engine stop has been requested, or an engine stop is requested after the cold leak test has been started, the method 200 follows the YES path from step 256 to step 260.

Step 260, COLD TEST ABORT COUNTER>FIFTH THRESHOLD determines if prior attempts to complete the cold leak test have been aborted because an engine stop was allowed. If too many prior attempts have aborted, i.e. more attempts than the fifth threshold have been made, the YES logic path is taken to step 262, IS TANK VACUUM DRAW COMPLETE? If YES, then the method 200 proceeds to step 258. If NO, the method proceeds to step 264, PREVENT ENGING STOP UNTIL TANK VACUUM DRAW COMPLETE, and then proceeds to step 258. This allows the portion of the cold leak test that relies on engine vacuum to complete before allowing the engine 12 to stop. By way of example and not limitation, a suitable value for the fifth threshold is five, and so in this non-limiting example five engine stops will be allowed before an engine stop is prevented. This allows for the fuel economy increases provided for by operating the engine in a stop-start fashion to be realized until it is deemed that completion of the cold leak test is critical to assure compliance with government regulations, for example.

If the YES path from step 260 is taken, the method 200 proceeds to step 266, COLD LEAK TEST ABORT COUNTER>SIXTH THRESHOLD?. If YES, the method 200 proceeds to step 268, INCREMENT PURGE DUTY CYCLE AND INCREASE DESIRED TEST VACUUM FOR THE NEXT EVAP SYSTEM MONITORING CYCLE. Increasing the purge duty cycle (i.e. the duty cycle of a control signal applied to the purge valve 22) will generally increase the purge flow 24, and so implement a more aggressive strategy for completing the cold leak test by increasing the rate at which the tank pressure is reduced. Increasing the desired test vacuum also serves to implement a more aggressive strategy by allowing the various sub-tests of the cold leak test (e.g. large leak test, small leak test, and very small leak test) to be completed more quickly. By way of example and not limitation, a suitable value for the sixth threshold is three, and so in this non-limiting example three engine stops will be allowed before a more aggressive test strategy is implemented.

Accordingly, the method 200 provides for increasing a purge duty cycle if the diagnostic abort counter is greater than a threshold. Furthermore, the method 200 provides for increasing a desired tank vacuum value prior a subsequent diagnostic test, and increasing a purge duty cycle during the subsequent diagnostic test if a cold leak test abort counter is greater than a first cold test threshold. Increasing the purge duty cycle may include applying a maximum purge duty cycle to reach the desired tank vacuum level faster. Also, the increased purge duty cycle is applied for the remainder of the driving cycle if the engine stop abort counter is greater than a second cold test threshold.

Furthermore, during the cold leak test, the method 200 provides for increasing a desired tank vacuum value prior a subsequent diagnostic test; and increasing a purge duty cycle during the subsequent diagnostic test if a cold leak test abort counter is greater than a first cold test threshold. Increasing the purge duty cycle may include applying maximum purge duty cycle to reach the desired tank vacuum level faster, wherein the increased purge duty cycle is applied for the remainder of the driving cycle if the engine stop abort counter is greater than a second cold test threshold.

If the NO path from step 266 is taken, or if step 268 is executed, the method 200 proceeds to step 270, INCREMENT COLD LEAK TEST ABORT COUNTER, where, for example, the controller 16 increments a counter register in memory to keep track of the number of times in the present driving cycle the cold leak test has been aborted because an engine stop was allowed. Following the incrementing of the cold leak test abort counter in step 270, the method 200 proceeds to step 272, INTERRUPT COLD LEAK TEST, ALLOW ENGINE STOP, RESUME COLD LEAK TEST AFTER ENGINE RESTART, where the cold leak test may be interrupted or paused, and then resumed when the engine 12 restarts.

Referring back to step 254, if an engine stop is not prioritized (NO), the method 200 proceeds to step 274, ENGINE STOP REQUESTED?, which is similar to step 256, but shown as a separate step because of the distinct logic paths that follow. If an engine stop has not been requested (NO path from step 274) then the cold leak test is performed by step 258. However, if an engine stop has been requested, or an engine stop is requested after the warm leak test has been started, the method 200 follows the YES path from step 274 to step 276.

Step 276, ENGINE STOP COUNTER>SEVENTH THRESHOLD determines if prior attempts to complete the cold leak test have been aborted because an engine stop was allowed. If too many prior attempts have aborted, i.e. more engine stops than the seventh threshold have occurred, the YES logic path is taken to step 278, DISABLE COLD LEAK TEST FOR REMAINDER OF DRIVING CYCLE AND ALLOW ENGING STOP. This avoids further attempts to complete the cold leak test before allowing the engine 12 to stop. By way of example and not limitation, a suitable value for the second threshold is five, and so in this non-limiting example five aborted attempts to complete a cold leak test caused by engine stops will be allowed before further attempts to complete a warm leak test are prohibited.

If the result of step 276 is NO, then the logic proceeds to step 280, ENGINE STOP COUNTER>EIGHTH THRESHOLD?. If YES, the method 200 proceeds to step 282, INCREMENT PURGE VALVE DUTY CYCLE, and then to step 284, INCREMENT ENGINE STOP COUNTER, followed by step 258. If NO, the method 200 proceeds from step 280 directly to step 284.

Figure 2D:
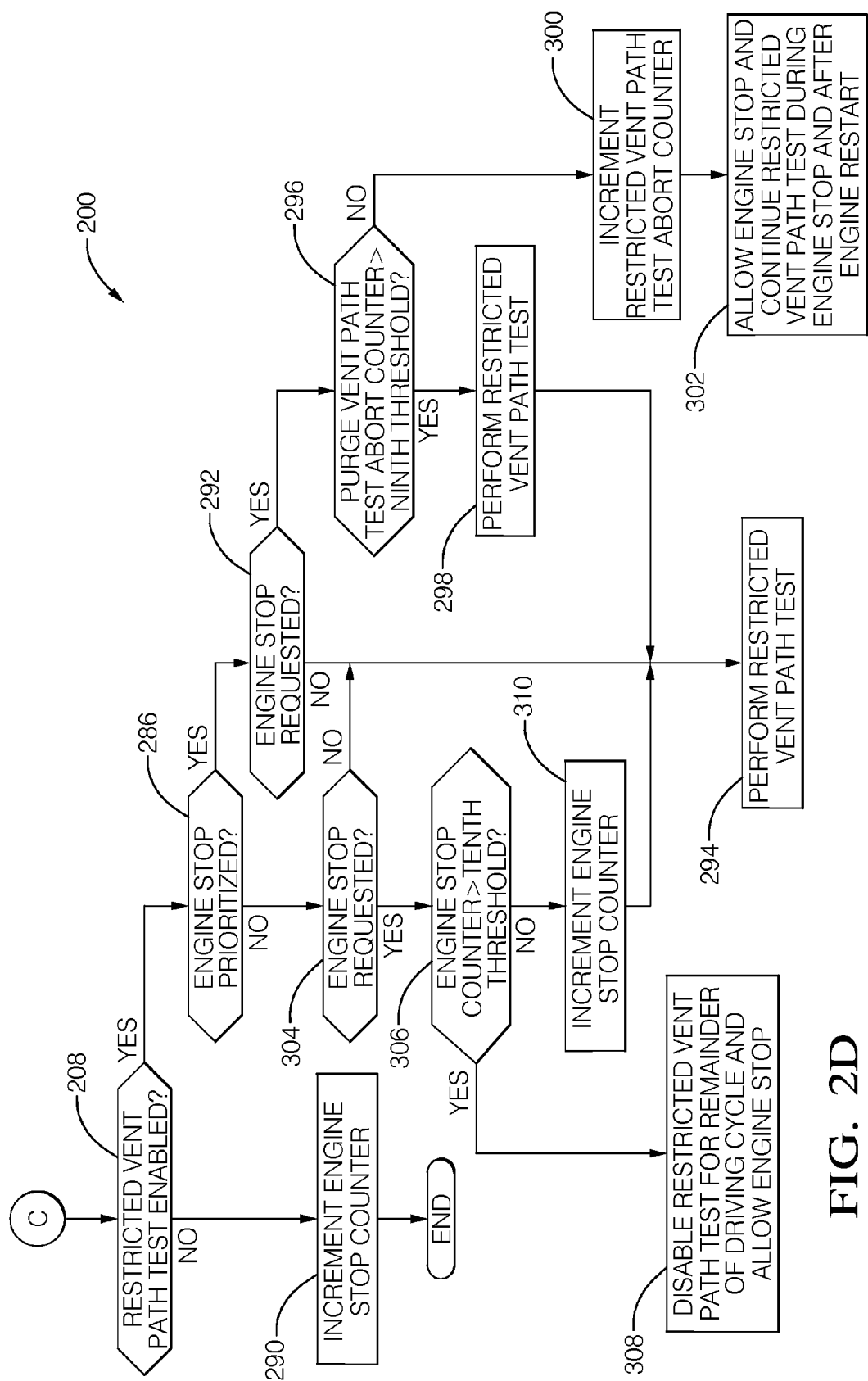

Referring now to FIG. 2D, if the response of step 208, RESTRICTED VENT PATH TEST ENABLED?, is YES, then the method 200 proceeds to step 286, ENGINE STOP PRIORITIZED?. Otherwise, the method 200 proceeds to step 290, ALLOW ENGINE STOP. To complete step 286, the controller 16 may examine previously stored calibration variables to determine if the calibration indicates that an engine stop (maximizes fuel economy) is prioritized or preferred over preventing an engine stop (improves the chance that the restricted vent path test will be completed, i.e. not interrupted by an engine stop). If YES (calibration indicates that allowing an engine stop is preferred), the method 200 proceeds to step 292, ENGINE STOP REQUESTED?.

If an engine stop has not been requested (NO path from step 292) then the restricted vent path test is performed by step 294, PERFORM RESTRICTED VENT PATH TEST. However, if an engine stop has been requested, or an engine stop is requested after the restricted vent path test has been started, the method 200 follows the YES path from step 292 to step 296.

Step 296, RESTRICTED VENT PATH TEST ABORT COUNTER>NINTH THRESHOLD determines if prior attempts to complete the restricted vent path test have been aborted because an engine stop was allowed. If too many prior attempts have aborted, i.e. more attempts than the first threshold have been made, the YES logic path is taken to step 298, PREVENT ENGINE STOP UNTIL RESTRICTED VENT PATH TEST COMPLETE. This allows the restricted vent path test to be completed before allowing the engine 12 to stop. By way of example and not limitation, a suitable value for the ninth threshold is five, and so in this non-limiting example five engine stops will be allowed before an engine stop is prevented. This allows for the fuel economy increases provided for by operating the engine in a stop-start fashion to be realized until it is deemed that completion of the restricted vent path test is critical to assure compliance with government regulations, for example.

If the NO path from step 296 is taken, the method 200 proceeds to step 300, INCREMENT RESTRICTED VENT PATH TEST ABORT COUNTER, where, for example, the controller 16 increments a counter register in memory to keep track of the number of times in the present driving cycle the restricted vent path test has been aborted because an engine stop was allowed.

Following the incrementing of the restricted vent path test abort counter in step 300, the method 200 proceeds to step 302, ALLOW ENGINE STOP AND CONTINUE RESTRICTED VENT PATH TEST AFTER ENGINE STOP AND AFTER ENGINE RESTART, because the restricted vent path test method allows for disrupted monitoring periods where the test can continue even if the engine 12 is stopped. Accordingly, during restricted vent path testing, the method 200 provides for interrupting the restricted vent path test prior to the engine stop, then allowing an engine stop, and then resuming the warm leak test following an engine restart.

Referring back to step 286, if an engine stop is not prioritized (NO), the method 200 proceeds to step 304, ENGINE STOP REQUESTED?, which is similar to step 292, but shown as a separate step because of the distinct logic paths that follow. If an engine stop has not been requested (NO path from step 304) then the restricted vent path test is performed by step 294. However, if an engine stop has been requested, or an engine stop is requested after the restricted vent path test has been started, the method 200 follows the YES path from step 304 to step 306.

Step 306, ENGINE STOP COUNTER>TENTH THRESHOLD determines if prior attempts to complete the restricted vent path test have been aborted because an engine stop was allowed. If too many prior attempts have aborted, i.e. more engine stops than the second threshold have occurred, the YES logic path is taken to step 308, DISABLE RESTRICTED VENT PATH TEST FOR REMAINDER OF DRIVING CYCLE AND ALLOW ENGING STOP. This avoids further attempts to complete the restricted vent path test before allowing the engine 12 to stop. By way of example and not limitation, a suitable value for the tenth threshold is five, and so in this non-limiting example five aborted attempts to complete a restricted vent path test caused by engine stops will be allowed before further attempts to complete a restricted vent path test are prohibited.

If the result of step 306 is NO, then the logic proceeds to step 310, INCREMENT ENGINE STOP COUNTER, where, for example, the controller 16 increments a counter register in memory to keep track of the number of times in the present driving cycle an engine stop was allowed while the restricted vent path test was in progress.

Accordingly, a method 200 of operating an automatic stop-start engine in a vehicle equipped with an evaporative emissions system is provided, where the automatic stopping of the engine may be prevented if an EVAP diagnostic test is being conducted. This allows engine calibrators the option to balance fuel economy and regulation compliance.

While this invention has been described in terms of the preferred embodiments thereof, it is not intended to be so limited, but rather only to the extent set forth in the claims that follow.

We claim:

1. A method of operating an engine in a vehicle equipped with an evaporative emissions system, wherein the engine is configured to perform automatically an engine stop and an engine restart when the vehicle stops moving to increase fuel economy of the vehicle, said method comprising:
    determining if an engine stop is allowed while a diagnostic test of the of the evaporative emissions system is being performed if an engine stop is requested; and
    preventing the engine stop if the engine stop is not allowed;
    wherein a diagnostic abort counter is incremented each time the diagnostic test is aborted during a drive cycle; and
    wherein the engine stop is not allowed if the diagnostic abort counter is greater than a threshold.

2. The method in accordance with claim 1, wherein said method further comprises
    interrupting the diagnostic test if the diagnostic abort counter is not greater than a threshold and an engine stop is requested; and
    resuming the diagnostic test after an engine restart.

3. The method in accordance with claim 1, wherein said method further comprises
    increasing a purge duty cycle if the diagnostic abort counter is greater than a threshold.

4. The method in accordance with claim 1, wherein said method further comprises
    disabling the diagnostic test for the remainder of the driving cycle if the diagnostic abort counter is greater than a threshold.

5. The method in accordance with claim 1, wherein said method further comprises
    incrementing an engine stop abort counter each time an engine stop is prevented during the diagnostic test if a calibration option designates that an engine stop is not prioritized, and
    disabling the diagnostic tests for the rest of the driving cycle if the engine stop abort counter is greater than a threshold.

6. The method in accordance with claim 1, wherein the diagnostic test includes one or more of
    a) a warm leak test,
    a) a purge-valve leak test,
    b) a cold leak test, and
    c) a restricted vent-path test.

7. The method in accordance with claim 6, wherein during the cold leak test said method further comprises
    increasing a desired tank vacuum value prior a subsequent diagnostic test; and
    increasing a purge duty cycle during the subsequent diagnostic test if a cold leak test abort counter is greater than a first cold test threshold.

8. The method in accordance with claim 7, wherein increasing the purge duty cycle includes applying maximum purge duty cycle to reach the desired tank vacuum level faster, wherein the increased purge duty cycle is applied until either the cold leak test completes or for the remainder of the driving cycle if the engine stop abort counter is greater than a second cold test threshold.

9. The method in accordance with claim 6, wherein the cold leak test includes one or more of a large leak test, a small leak test, and a very small leak test.

10. The method in accordance with claim 9, wherein during a cold leak test the method further comprises
    allowing an engine stop after completion of the large leak test.

11. The method in accordance with claim 6, wherein during the restricted vent-path test the method further comprises
    allowing an engine stop;
    interrupting the restricted vent-path test while the engine is stopped; and
    resuming the restricted vent-path test after an engine restart.

12. The method in accordance with claim 6, wherein during the warm leak test the method further comprises
    interrupting the warm leak test prior to the engine stop; then
    allowing an engine stop; and then
    resuming the warm leak test following an engine restart.

13. The method in accordance with claim 6, wherein the cold leak test includes one or more of a large leak test, a small leak test, and a very small leak test.

14. A method of operating an engine in a vehicle equipped with an evaporative emissions system, wherein the engine is configured to perform automatically an engine stop and an engine restart when the vehicle stops moving to increase fuel economy of the vehicle, said method comprising:
    determining if an engine stop is allowed while a diagnostic test of the of the evaporative emissions system is being performed if an engine stop is requested;
    preventing the engine stop if the engine stop is not allowed; and
    incrementing a diagnostic abort counter each time the diagnostic test is aborted due to engine stop during a drive cycle if a calibration option designates that an engine stop is prioritized, wherein
    the engine stop is not allowed to interrupt the diagnostic test for the rest of the driving cycle if the diagnostic abort counter is greater than a threshold.

15. The method in accordance with claim 14, wherein said method further comprises
    interrupting the diagnostic test, then
    allowing an engine stop, and then
    resuming the diagnostic test following an engine restart if the diagnostic abort counter is not greater than the threshold.

* * * * *